April 11, 1967     H. RUPP     3,313,993
MOTOR-GENERATOR USING A RESONANCE CIRCUIT
Filed Dec. 20, 1963
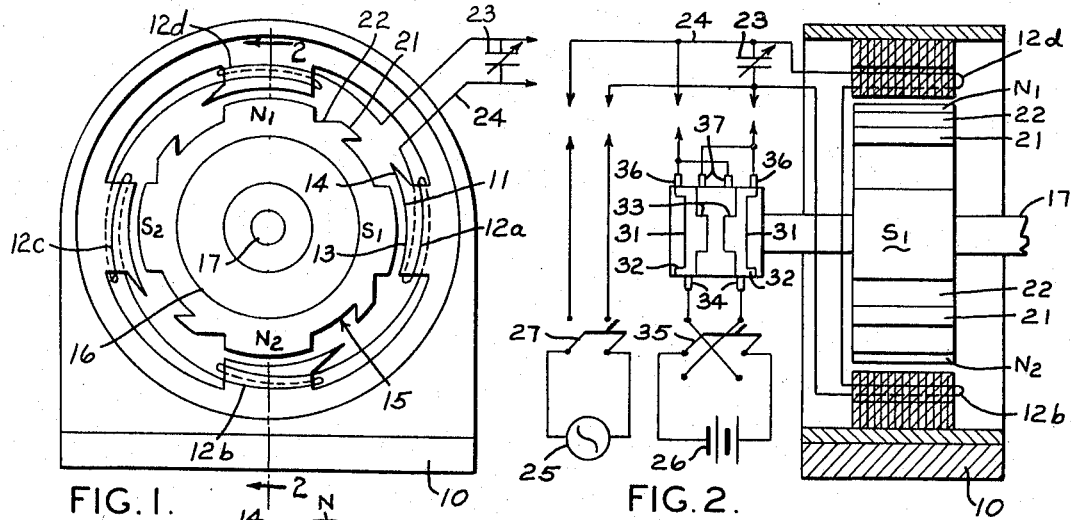
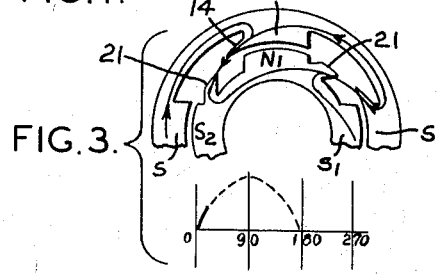
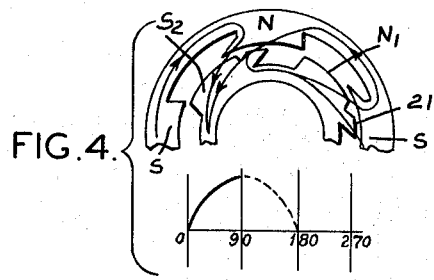
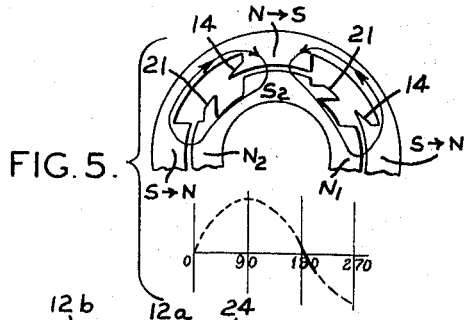
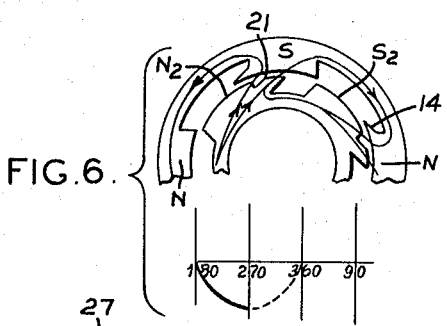
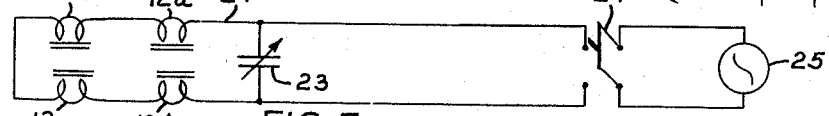
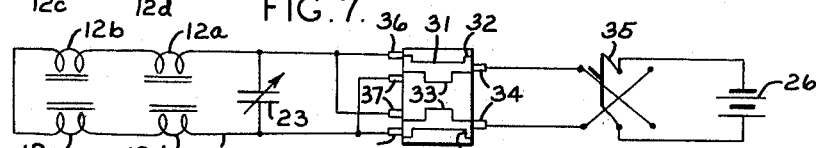
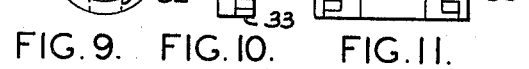
INVENTOR,
HERMANN RUPP
BY Cohn and Powell
ATTORNEYS.

000
United States Patent Office 3,313,993
Patented Apr. 11, 1967

3,313,993
MOTOR-GENERATOR USING A RESONANCE CIRCUIT
Hermann Rupp, P.O. Box 257,
Collinsville, Ill. 62234
Filed Dec. 20, 1963, Ser. No. 332,105
6 Claims. (Cl. 318—254)

This invention relates generally to improvements in a resonance motor-generator, and more particularly to improvements in a resonance motor that is self-starting and operable by either a direct or alternating current prime power source.

The present invention constitutes an improvement over the disclosure of applicant's prior U.S. Patent No. 2,922,943, issued Jan. 26, 1960, and entitled, "Electrical Machine."

An important objective is achieved by the provision of a resonance circuit that includes series-connected windings for the stator poles formed of magnetic material and a condenser connected in parallel with the stator windings, and by the provision of means supplying alternating current pulses from a source of electric current to the resonance circuit, whereby the repulsive and attractive magnetic forces between the electromagnetic stator poles and the permanent magnetic rotor poles are utilized to start rotor rotation and whereby efficient operation of the resonance circuit is maintained.

Another important object is realized by using permanent magnets for the rotor poles which cooperate with an equal number of stator poles of magnetic material so that the rotor will always assume a predetermined at-rest position in which the stator and rotor poles are disposed in direct opposition. By energization of the stator windings with correctly timed alternating current pulses to control the polarity of the stator poles and the efficiency of the resonance circuit, rotation of the rotor will be starter from the at-rest position and will be maintained.

Still another important objective is afforded in that each rotor pole and each adjacent stator pole in the direction of rotor rotation has portions in close proximity so as to provide a magnetic attraction between such portions and to provide a magnetic path therebetween upon energization of the stator windings such that the directly opposed stator and rotor poles have the same polarity and such that each rotor pole and each adjacent stator pole have the opposite polarity, whereby rotor rotation is started.

An important object is obtained in that the resonance circuit has a predetermined alternating current frequency and that the current pulses are supplied from the prime power source of either direct or alternating current in synchronization with the resonance circuit current frequency.

Another important objective is provided in that the prime power source may be of single phase alternating current that is supplied to the resonance circuit in synchronization with the resonance circuit current frequency.

Yet another important object is attained in that the prime power source may be of direct current that is supplied in pulses ta the start of each half cycle of and in synchronization with the frequency of the resonance circuit current.

An important object is achieved by an improved means for supplying the direct current pulses from the source to the resonance circuit. Specifically, the means includes a pair of electrically insulated slip rings having axially extending toe portions, a pair of supply brushes connected electrically to the terminals of the direct current source and engaging the slip rings, and two pair of take-off brushes, a first pair of which contacts the toe portions during one half cycle of the resonance circuit current frequency and the second pair of which contacts the toe portions durfing the other half cycle, one take-off brush of each pair being connected to the one terminal of the resonance circuit and the other take-off brush of each pair being connected to the second terminal of the resonance circuit.

Another important objective is realized by placing a reversing switch between the source of direct current and the supply brushes so that the current pulses are supplied to cause energization of the stator windings at the correct phase of resonance circuit current frequency in order that the directly opposed stator and rotor poles be of the same polarity for self-starting operation.

It is an important objective to provide an electric machine of this type that is simple and durable in construction, economical to manufacture and assembly, highly efficient in operation, and which is capable for use in any situation where it is desirable to have a constant speed under a range of no load to full load conditions.

The foregoing and numerous other objects and advantages of the invention will more clearly appear from the following detailed description of a preferred embodiment, particularly when considered in connection with the accompanying drawing, in which:

FIG. 1 is a front elevational view of the electric machine clearly illustrating the resonance circuit;

FIG. 2 is a view taken on line 2—2 of FIG. 1, and showing the means for supplying electric energy to the machine;

FIGS. 3, 4, 5 and 6 are partial views of the stator and rotor showing successive positions of the rotor magnet poles with respect to the stator poles, and graphs showing the flow of current in the stator pole windings relative to each corresponding position;

FIG. 7 is a circuit diagram of the electrical system utilizing an alternating current prime power source;

FIG. 8 is a circuit diagram of the electrical system utilizing a direct current prime power source;

FIG. 9 is an end elevational view of a slip ring;

FIG. 10 is a side elevational view of the ring shown in FIG. 9, and

FIG. 11 is a side elevational view of the direct current distributor.

Referring now by characters of reference to the drawing, and first to FIG. 1, it is seen that the electric machine includes a supporting frame 10 on which there is mounted an annular series of fixed, radially inwardly extending, equally spaced stator poles 11. Four of these stator poles 11 are provided in the machine disclosed, but it will be understood that a greater or less number of pole pairs may be provided. These stator poles 11 form the cores of four electromagnets and each of them is therefore provided with a winding, all of which windings 12a to 12d are connected in series as shown in FIGS. 1, 7 and 8. The outer face 13 of each stator pole 11 is of an arcuate configuration and is provided with an elongate portion 14 extending in a direction opposite to the direction of rotation of the machine rotor generally indicated by 15. The stator poles 11, and if desired the whole stator assembly, is preferably formed of laminations of magnetic material.

The rotor 15 includes a central disc 16 mounted on a rotatable shaft 17. At the outer periphery of the disc 16, there is provided an annular series of equally spaced, radially outwardly extending rotor poles 20, the outer arcuate faces of which conform to and travel in a path closely adjacent to the outer faces 13 of the stator poles 11. The central mounting disc 16 of the rotor 10 is formed of a non-magnetic material in order to insulate from ground the magnetic circuit of the machine which includes the rotor poles 20 and the stator poles 11.

It will be importantly noted that the rotor poles 20 and the annular member 21 of which they form a part are permanent magnets and are preferably formed of laminated construction. For convenience in later description of the operation, the rotor poles 20 are designated with the reference characters N1, S1, N2 and S2 in a clockwise direction respectively to indicate the polarity.

In the disclosed embodiment there are two pair of rotor poles 20 to conform to and cooperate with the two pair of stator poles 11. Obviously, the pairs of rotor poles 20 may be varied with the pairs of stator poles 11, it being necessary only that the rotor 10 and the stator have the same number of pole pairs.

The outer face of each rotor pole 20 is provided with elongated portion 21 extending in the direction of rotation of the rotor in proximity to the stator pole portion 14 of the next adjacent stator pole to cooperate therewith in a manner which is later described. The rotor portion 21 is separated from the main body of the rotor pole 20 by a transverse groove 22 that serves to concentrate the path of magnetic force between the stator pole portion 14 and the rotor pole portion 21 and aids in the self-starting operation of the machine and in the positioning of the rotor in the predetermined at-rest or static position.

A variable condenser 23 is connected in parallel with the series-connected stator windings 12a to 12d to provide a resonance circuit 24 having a predetermined resonance circuit current frequency. The sine wave shown in broken lines in FIGS. 3–6 illustrates the resonance circuit current frequency.

The prime power source for operating this electric machine can either be one of alternating current as indicated by 25 in FIG. 7 or one of direct current as indicated by 26 in FIG. 8. It will be assumed first that alternating current is used for the prime power and is applied through a switch 27 to the resonance circuit 24 as is indicated by the circuit diagram of FIG. 7.

The rotor 15 in the static position will be located as is illustrated in FIGS. 1 and 3 in which the main portion of each rotor pole 20 is directly opposite to the main portion of a cooperating stator pole 11, the magnetic field created by the permanent magnets of the rotor poles 20 passing through the opposing stator poles 11 to cause this result. This initial static position is also illustrated in FIG. 3.

When alternating current is supplied from the prime power source 25 to the resonance circuit 24 by closing of the switch 27, the first initial impulse of this alternating current is to energize the stator windings 12a to 12d so that the stator poles 11 have the same polarity as the directly opposite rotor poles 20. The frequency of the alternating current from the prime power source 25 is in synchronization with the resonance circuit current frequency. If the switch 27 is closed at a phase in the cycle such that the alternating current pulse will produce an excitation in the stator windings 12a to 12d such that the stator poles 11 have the opposite polarity from the opposing rotor poles 20 there will be an increased locking effect between the stator and rotor poles because of the attraction forces created by such polarity which would preclude rotor rotation. However, this excitation of the stator windings 12a to 12d will be automatically changed by the following alternating current half cycle so that the stator poles 11 will have the same polarity as the directly opposite rotor poles 20.

When this occurs, the magnetic lines of force will assume the path and direction indicated in FIG. 3. It will be importantly noted that the elongated stator portions 14 and the cooperating rotor portions 21 located in proximity will provide a path for these magnetic lines of force and that the initial pulse of the alternating current from the prime power source 25, as indicated by the full line in the accompanying graph of FIG. 3, will cause an attraction between the stator and rotor portions 14 and 21 so as to cause an initial clockwise turning of the rotor 15. In addition, the rotation of the rotor 15 is enhanced by the repulsive forces created between the directly opposing stator and rotor poles 11 and 20 of the same polarity.

As the rotor pole designated S2 moves through 90 electrical degrees from the static position shown in FIG. 3 to the position shown in FIG. 4, the magnetic lines of force will change to that illustrated in FIG. 4. At this phase of the cycle, the greatest torque is realized in that there is considerable force pulling the rotor poles because of the attraction between each rotor pole 20 and the next adjacent stator pole 11 in the direction of rotation as a result of the opposite polarities, and because of the considerable repulsion between each rotor pole and the next adjacent stator pole in the direction opposite to rotor rotation as a result of the same polarities. As indicated by the corresponding graph of FIG. 4, the alternating current as shown in the full lines is supplied to the stator windings 12a to 12d in synchronization with the resonance circuit current frequency from zero to 90 electrical degress. At this point, the magnetic fields established by the alternating current pulse begins to collapse and a voltage will therefore be generated in the resonance circuit that produces a field having the same direction as the first initiating power pulse, as is established by Lenz's law. In addition, the condenser 23 will discharge and cooperate with the self-induced electromagnetic energy to maintain the excitation of the stator pole windings 12a to 12d during the remainder of the first half cycle of operation. The end of the positive half cycle of operation is indicated in FIG. 5 when the rotor and stator poles are approximately opposite each other.

Upon completion of the positive half cycle of operation the negative half cycle of operation takes place during which excitation of the stator windings 12a to 12d is caused by the next half cycle of alternating current from the alternating current prime power source 25 supplied to the resonance circuit 24 in synchronization with the resonance circuit current frequency. It will be importantly noted that the polarity of the stator poles 11 is reversed during the negative half cycle with respect to their polarity during the positive half cycle so that the polarity of the stator poles 11 is the same as the polarity of the rotor poles 20 as the stator and rotor poles pass each other.

FIG. 5 illustrates the magnetic lines of force right at the completion of the positive half cycle of operation. The graph of FIG. 5 indicates in full lines the alternating current pulse applied right at this point of operation at which the stator pole polarities are reversed. Immediately upon reversal the magnetic lines of force will be the same as is previously illustrated in FIG. 3 and the operation during the negative half cycle is the same as during the positive half cycle. Briefly, the alternating current pulse supplied to the stator windings 12a to 12d maintain the magnetic field from 180 to 270 electrical degrees as is illustrated by the full lines in the sine wave of the graph illustrated in FIG. 6. Again, the magnetic attraction between the stator and rotor portions 14 and 21, resulting from the opposite polarity of the rotor poles 20 relative to the next adjacent stator poles 11 in the direction of rotor rotation and the repulsive forces between opposite stator and rotor poles of the same polarity, cause the rotor to turn in a clockwise direction from the position shown in FIG. 5 to the position shown in FIG. 6 during the movement from 180 to 270 electrical degrees.

At this phase of cycle operation of 270 electrical degrees, the alternating current pulse from the prime power source 25 begins to diminish. Again, as the magnetic field established by this alternating current pulse at the stator poles 11 begins to collapse, a voltage is generated which produces a field having the same direction as the initiating power pulse provided during the 180 to 270 electrical degrees of the operation cycle. Further the condenser 23 of the resonance circuit 24 is discharged and cooperates with the self-induced electromagnetic energy to maintain the excitation of the stator pole windings 12a to 12d until completion of the negative half cycle. Upon completion of one full electrical cycle of the motor, the rotor poles 20 will be located directly opposite the stator poles 11 and the next cycle will take place in the same manner.

Mounted on and rotatable with the drive shaft 17 is a drum 30 constituting a distributor formed of electrically insulating material, the drum 30 having inbedded in its peripheral surface a pair of circumferential slip rings 31 of substantially identical construction. As is best seen in FIGS. 9–10 inclusive, each slip ring 31 includes toe portions 32 extending axially from one side and another set of toe portions 33 extending axially from the other side. The outer surfaces of the toe portions 32 and 33 are flush with the outer surface of drum 30. For reasons which will later appear, the toe portions 32 and 33 of each slip ring 31 are circumferentially offset and spaced.

A pair of supply brushes 34 electrically and slidably engage the slip rings 31, as is best seen in FIGS. 2 and 8. The supply brushes 34 are connected to the terminals of the prime power source 26 of direct current by a reverse switch 35, thereby enabling either brush 34 and hence either slip ring 31 to be directly connected selectively to either the negative or positive post of such prime power source 26.

A first pair of take-off brushes 36 engage the toe portions 32 of slip rings 31 during the first 90 electrical degrees of the first half cycle of the resonance circuit current frequency. This pair of take-off brushes 36 are electrically connected to the terminals of the resonance circuit 24. During the remaining period of the cycle, the take-off brushes 36 are electrically disengaged from the resonance circuit 24 because they engage the insulating material of the drum 30 between the toe portions 32.

A second set of take-off brushes 37 electrically and slidably engage the other set of toe portions 33 of the slip rings 31 during the first 90 electrical degrees of the second half cycle of the resonance circuit current frequency, and hence serve to transmit the direct current pulse during this cycle period to the resonance circuit 24. It will be noted that the connections to the second set of take-off brushes 37 are relatively crossed so that the relative polarity of the resonance circuit 24 is reversed.

To operate the motor with the direct current prime power source 26, the reverse switch 35 is thrown or closed in one direction to transmit the direct current power to the slip rings 31, and thence from one pair of the take-off brushes 36 or 37 to the resonance circuit. If the stator windings 12a to 12d are energized by take-off brushes 36 or 37, depending upon which set is engaging the respective toe portions 32 or 33 of slip rings 31, such that the stator poles 11 are of the opposite polarity from the directly opposed rotor poles 20 in the static position, there will be an increase in magnetic attraction between the stator and rotor poles which will tend to lock the rotor 15 in place. In this event, the rotor will obviously not rotate. Accordingly, the switch 35 must be reversed in order to reverse the polarity of the slip rings 31.

It will be assumed that the switch 35 is closed so that the take-off brushes 36 engaging the toe portions 32 supply a direct current pulse to the stator windings 12a to 12d. This is indicated by the full line showing in the positive half cycle graph of FIG. 3. This energization of the stator windings 12a to 12d causes the stator poles 11 to be of the same polarity as the rotor poles 20 located directly opposite, and causes magnetic lines of force as is indicated in FIG. 3. Because of the proximity of the extended rotor and stator portions 21 and 14, there will be a concentration of the lines of force through such pole portions. In view of the fact that these stator portions 14 and 21 are of the opposite polarity, there is a magnetic attraction that causes the rotor 15 to rotate in a clockwise direction from the position shown in FIG. 3 to the position shown in FIG. 4. This movement is facilitated by the repulsive forces between the directly opposite stator and rotor poles that tend to turn the rotor in this same direction. It is seen from FIG. 4, that the direct current pulse is synchronized with the resonance circuit current frequency and is maintained by engagement of the take-off brushes 36 with the toe portions 32 for the first 90 electrical degrees of the positive half cycle.

At this point of 90 electrical degrees, the brushes 36 disengage from the toe portions 32 to terminate the direct current pulse as is indicated by the graph of FIG. 4. Neither set of the take-off brushes 36 or 37 engage the slip rings 31 from 90 electrical degrees to 180 electrical degrees. As soon as the direct current pulse is terminated at 90 electrical degrees, the magnetic fields established by this power pulse at the stator poles 11 will collapse and a voltage will therefore be generated which produces a field having the same direction as that created by the first initiating power pulse, as is established by Lenz's law. This self-induced electromagnetic energy will maintain the excitation of the stator pole windings 12a to 12d, and the condenser 23 will be discharged, as the rotor poles 20 move from the position shown in FIG. 4 between the stator poles 11 to the position directly aligned with the stator poles as is shown in FIG. 5.

Just before the other set of take-off brushes 37 engage their respective toe portions 33 of the slip rings 31, the magnetic lines of force assume the paths and directions shown in FIG. 5. When the stator and rotor poles 11 and 20 are directly aligned opposite each other as shown in FIG. 5, the take-off brushes 37 engage their toe portions 33 of the slip rings 31 and excite the stator windings 12a to 12d to reverse the polarity of the stator poles 11 so that the directly aligned rotor and stator poles will be again of the same polarity. The direct current pulse supplied by the take-off brushes 37 to the resonance circuit 24 will begin at the negative half cycle or at 180 electrical degrees and will be maintained until 270 electrical degrees as is illustrated by the full line shown in the graphs of FIGS. 5 and 6. In other words, the take-off brushes 37 maintain electrical contact with the slip ring toe portions 33 from 180 electrical degrees to 270 electrical degrees of the resonance circuit current frequency and in synchronization therewith.

Again, it will be noted that when the stator and rotor poles directly opposite each other are of the same polarity, the pole portions 14 and 21 located in proximity are of opposite polarity and therefore have an attraction that causes continued rotation of the rotor 15. The repulsive forces between the opposing stator and rotor poles assist in this continued rotation.

When the rotor pole 20 moves to the midway position between the stator poles as is illustrated in FIG. 6, the take-off brushes 37 disengage from the slip ring toe portions 33 and hence the direct current pulse is terminated at the 270 electrical degrees. The electromagnetic field is maintained by the self-inductance of the stator windings 12a to 12d as the magnetic fields of the stator windings collapse, and by the discharge of the variable condenser 23. The end of the complete cycle is ended when the stator and rotor poles are again located in directly opposed relationship, at which point the cycle and operation is repeated.

The speed of this four-pole unit described at 60 cycles is frequency/pole-pairs×seconds=60/2×60=1800 r.p.m. For eight poles, the speed would be 60/4×60=1200 r.p.m. This device will maintain the same speed from no load to full load. If the load becomes too great for the power development, the device will come to a dead halt.

The electrical machine may be used as a generator with the load either connected in series with the resonance circuit 24 or in parallel as the prime power source 25 or 26 is connected when used as a motor.

Although the invention has been described by making a detailed reference to two embodiments, such detail is to be understood in an instructive, rather than in any restrictive sense, many variants being possible within the scope of the claims hereunto appended.

I claim as my invention:

1. An electric machine comprising:
   (a) a stator having a substantially circular series of spaced poles formed of magnetic material,
   (b) a winding for each of the stator poles, the windings being connected in series,
   (c) a condenser connected in parallel with the series-connected stator windings to provide a resonance circuit having a pre-determined alternating current frequency,
   (d) a rotor mounted for rotation within the stator and having a substantial circular series of poles formed of permanent magnets and being equal in number to the stator poles,
   (e) a source of electric current, and
   (f) means applying alternating current pulses from the source to the resonance circuit in synchronization with the resonance circuit frequency,
   (g) each rotor pole cooperating with one of the stator poles to define a predetermined at-rest position of the rotor,
   (h) each rotor pole and each next adjacent stator pole in the direction of rotor rotation including portions in proximity to provide an attraction between such portions under the influence of a magnetic field therebetween upon energization of the stator windings whereby such attraction causes rotation of the rotor from the at-rest position,
   (i) the source of electric current is one of direct current,
   (j) a pair of electrically insulated slip rings are rotated at a speed equal to the speed of the rotor, the slip rings including toe portions extending axially from each side,
   (k) a pair of current supply brushes engaging the slip rings, the supply brushes being connected electrically to the terminals of the source of direct current,
   (l) two pair of current take-off brushes,
   (m) a first pair of the take-off brushes contacting the toe portions at one side of the slip rings during the first portion of one half cycle of the resonance circuit current frequency, and
   (n) a second pair of the take-off brushes contacting the toe portions at the other side of the slip rings during the first portion of the other half cycle,
   (o) one take-off brush of each pair being connected to one terminal of the resonance circuit while the other take-off brush of each pair is connected to the second terminal of the resonance circuit,
   (p) the stator windings being energized at start so that the opposed stator and rotor poles are of the same polarity while the adjacent pole portions are of opposite polarity whereby the rotor is caused to rotate, and
   (q) a switch connecting the terminals of the source of direct current selectively to the supply brushes to determine the polarity of the stator poles for starting operation.

2. An electric machine comprising:
   (a) a stator having a substantially circular series of spaced poles formed of magnetic material,
   (b) a winding for each of the stator poles, the windings being connected in series,
   (c) a condenser connected in parallel with the series-connected stator windings to provide a resonance circuit,
   (d) a rotor mounted for rotation within the stator and having a substantially circular series of poles formed of permanent magnets,
   (e) a source of direct current, and
   (f) means supplying pulses of direct current from the source to the resonance circuit,
   (g) the resonance circuit having a predetermined alternating current frequency, and
   (h) the said means supplying the direct current pulse from the source to the resonance circuit at each half cycle of and in synchronization with the resonance circuit current frequency and during the first 90 electrical degrees of each half cycle with relatively reversed polarity at each half cycle.

3. An electric machine comprising:
   (a) a stator having a substantially circular series of spaced poles formed of magnetic material,
   (b) a winding for each of the stator poles, the windings being connected in series,
   (c) a condenser connected in parallel with the series-connected stator windings to provide a resonance circuit having a predetermined alternating current frequency,
   (d) a rotor mounted for rotation within the stator and having a substantially circular series of poles formed of permanent magnets and being equal in number to the stator poles,
   (e) a source of direct current, and
   (f) means supplying direct current pulses from the source to the resonance circuit in synchronization with the resonance circuit current frequency and during substantially the first ninety (90) electrical degrees of each half cycle and with relatively reversed polarity at each half cycle,
   (g) each rotor pole cooperating with one of the stator poles to define a predetermined at-rest position of the rotor, each rotor pole and each next adjacent stator pole in the direction of rotor rotation including portions in proximity to provide an attraction between such portions under the influence of a magnetic field therebetween upon energization of the stator windings whereby such attraction causes rotation of the rotor from the at-rest position in one direction.

4. An electric machine comprising:
   (a) a stator having a substantially circular series of spaced poles formed of magnetic material,
   (b) a winding for each of the stator poles, the windings being connected in series,
   (c) a condenser connected in parallel with the series-connected stator windings to provide a resonance circuit,
   (d) a rotor mounted for rotation within the stator and having a substantially circular series of poles formed of permanent magnets,
   (e) a source of direct current,
   (f) a pair of electrically insulated slip rings, the slip rings including axially extending toe portions,
   (g) a pair of current supply brushes engaging the slip rings, the supply brushes being connected electrically to the terminals of the source of direct current,
   (h) two pair of current take-off brushes,
   (i) a first pair of the take-off brushes contacting toe portions of the slip rings during one-half cycle of the resonance circuit current frequency,
   (j) a second pair of the take-off brushes contacting toe portions of the slip rings during the other half cycle,
   (k) one take-off brush of each pair being connected to one terminal of the resonance circuit and the other take-off brush of each pair being connected to the second terminal of the resonance circuit, the brushes supplying a direct current pulse at each half cycle of the resonance circuit current, the pulses being of relatively reversed polarity at each half cycle, and
   (l) a reverse switch connecting the terminals of the source of direct current selectively to the supply brushes to control the polarity of the slip rings for starting operation.

5. An electric machine comprising:

(a) a stator having a substantially circular series of spaced poles formed of magnetic material,
(b) a winding for each of the stator poles, the windings being connected in series,
(c) a condenser connected in parallel with the series-connected stator windings to provide a resonance circuit,
(d) a rotor mounted for rotation within the stator and having a substantially circular series of poles formed of permanent magnets,
(e) a source of direct current,
(f) a pair of electrically insulated slip rings, the slip rings including toe portions extending axially from each side,
(g) a pair of current supply brushes engaging the slip rings, the supply brushes being connected electrically to the terminals of the source of direct current, and
(h) two pair of current take-off brushes, a first pair of the take-off brushes contacting the toe portions at one side of the slip rings during one-half cycle of the resonance circuit current frequency, and a second pair of the take-off brushes contacting the toe portions at the other side of the slip rings during the other half cycle, one take-off brush of each pair being connected to one terminal of the resonance circuit and the other take-off brush of each pair being connected to the second terminal of the resonance circuit, the brushes supplying a direct current pulse at each half cycle of the resonance circuit current, the pulses being of relatively reversed polarity at each half cycle.

6. An electric machine comprising:
(a) a stator having a substantially circular series of spaced poles formed of magnetic material,
(b) a winding for each of the stator poles, the windings being connected in series,
(c) a condenser connected in parallel with the series-connected stator windings to provide a resonance circuit having a predetermined current frequency,
(d) a rotor mounted for rotation within the stator and having a substantially circular series of poles formed of permanent magnets arranged in alternate polarity,
(e) the rotor poles being magnetically attracted to directly opposite stator poles to hold the rotor in a predetermined at-rest position,
(f) each rotor pole and each adjacent stator pole in the direction of rotor rotation including portions located in proximity for attraction resulting from the rotor and stator poles being of opposite polarity and from a magnetic field therethrough produced by energization of the stator windings whereby to cause rotation of the rotor from the at-rest position in one direction,
(g) at least one of the portions of the rotor and the stator poles located in proximity is provided with a transverse groove to produce a concentration of magnetic forces between such portions which aid in the self-start operation,
(h) a source of electric current, and
(i) means supplying the current pulses from the source to the resonance circuit in synchronization with the resonance circuit current frequency, the pulse being supplied at each half cycle of the resonance circuit current, the pulses being of relatively reversed polarity at each half cycle, and the rotor and stator poles when disposed directly opposite each other are of the same polarity at the start of each half cycle.

References Cited by the Examiner

UNITED STATES PATENTS

| | | | |
|---|---|---|---|
| 1,197,978 | 9/1916 | Warner | 321—49 |
| 1,937,739 | 12/1933 | Woodward et al. | 318—254 |
| 2,227,894 | 1/1941 | Elms | 310—164 |
| 2,250,395 | 7/1941 | Russell | 310—164 |
| 2,705,299 | 3/1955 | Castagna | 318—441 |
| 2,794,137 | 5/1957 | Faus et al. | 310—156 |
| 2,922,943 | 1/1960 | Rupp | 318—254 |
| 3,124,733 | 3/1964 | Andrews | 318—254 |

FOREIGN PATENTS 560,086   7/1958   Canada.

BENJAMIN DOBECK, *Primary Examiner.*
ORIS L. RADER, *Examiner.*